(No Model.)

A. J. MORLEY.
COMBINED CULTIVATOR AND WEED CUTTER.

No. 557,080. Patented Mar. 24, 1896.

WITNESSES:
John A. Rennie
J. Fred Acker

INVENTOR
A. J. Morley
BY Munn & Co.
ATTORNEYS.

UNITED STATES PATENT OFFICE.

ALFRED JAMES MORLEY, OF CHULA VISTA, CALIFORNIA.

COMBINED CULTIVATOR AND WEED-CUTTER.

SPECIFICATION forming part of Letters Patent No. 557,080, dated March 24, 1896.

Application filed June 12, 1895. Serial No. 552,571. (No model.)

*To all whom it may concern:*

Be it known that I, ALFRED JAMES MORLEY, of Chula Vista, in the county of San Diego and State of California, have invented a new and Improved Combined Cultivator, Weed-Cutter, Pulverizer, and Leveler, of which the following is a full, clear, and exact description.

My invention relates to agricultural implements; and it has for its object to provide an implement or machine in which will be combined a cultivator, a weed-cutter, and a pulverizer and leveler, and to construct the machine in a simple, durable, and economic manner, the cultivator teeth or shovels being readily removed and so shaped as not only to cultivate the ground but to throw the earth, assisted by the teeth-supports, either in direction of the center of the machine or to the outside thereof, as may be desired, the frame of the machine being so constructed that in itself it constitutes substantially a continuous plate, directing the loosened soil over to the rear and insuring the breaking of such ground as had not been acted upon by the teeth or shovels, the frame being so constructed also that it will smooth over the loosened soil, a comb being likewise provided to finally treat the surface over which the machine is passed.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in all the views.

Figure 1:
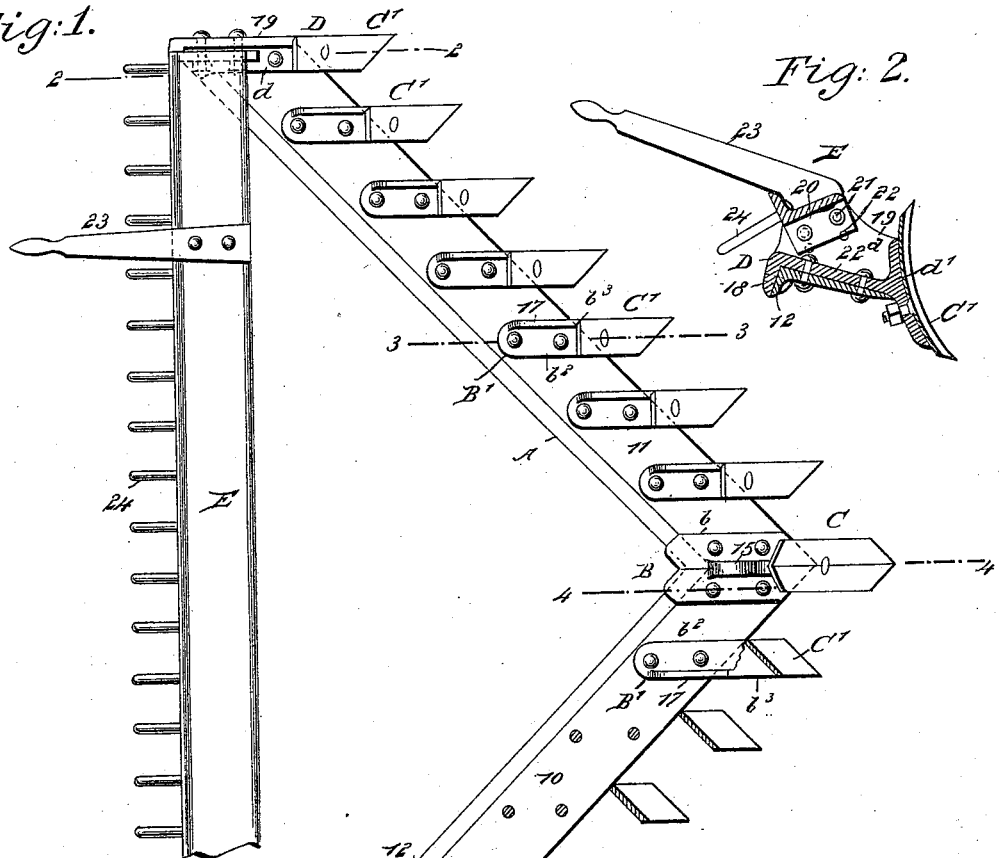
Figure 2:
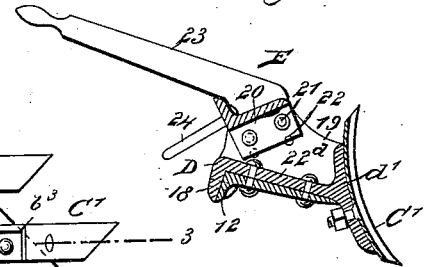
Figure 3:
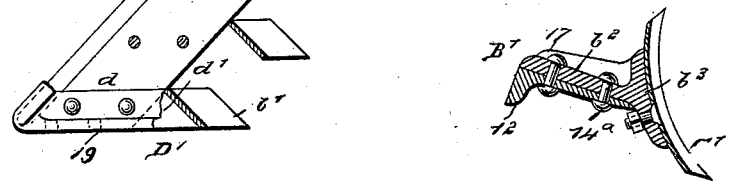

Figure 1 is a plan view of the machine, a portion of the tie-beam and comb being broken away. Fig. 2 is transverse section taken substantially on the line 2 2 of Fig. 1. Fig. 3 is a transverse section taken on the line 3 3 of Fig. 1, and Fig. 4 is a similar section taken on the line 4 4 of Fig. 1.

Figure 4:
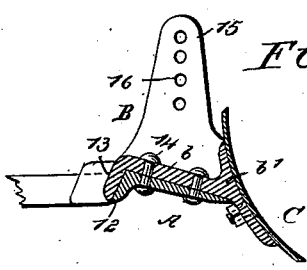

In carrying out the invention the frame A of the machine comprises two members 10 and 11, placed at angles to one another, representing in plan view substantially the letter V, the point being to the front. The members of the frame are given an upward and rearward inclination in cross-section, and at the back each frame member has a downwardly and substantially rearwardly-extending continuous rib 12 formed thereon, as shown in the cross-sectional views, and the forward edges of the members of the frame are beveled upon their under faces to form cutting-edges.

Where the two members of the frame are brought together they are rigidly secured or connected by means of a bracket plate or block B, which conforms to the upper surface of the point of the frame and extends backward, terminating in a downwardly and rearwardly extending flange 13, as shown in Fig. 4, resting against and conforming to the back of the rib 12 on the frame. The bracket-plate is secured to the frame by means of rivets 14, bolts, or their equivalents, and consists of a body-section $b$, closely fitting to the upper surface of the frame and extending to the point thereof, and a shank-section $b'$, which extends both above and below the body, being given a downward and a forward inclination and having its forward face more or less concave. A draft-bar 15 is projected upward from about the central portion of the body of the bracket-plate and is provided with apertures 16 to receive a clevis or other draft device.

The leading tooth or shovel C is secured to the concaved surface of the shank of the central bracket-plate by means of a bolt or equivalent fastening device and extends both above and below said shank, as is also shown in Fig. 4, and this leading shovel or tooth is inclined rearwardly in opposite directions from a longitudinal central line; whereby it is more or less angular in cross-section, and this leading tooth is furthermore provided with a diamond-shaped cutting-edge at both top and bottom, so that the tooth is rendered reversible.

At different distances apart auxiliary bracket-plates B' are secured upon the upper face of the frame at each side of the central or main bracket-plate B. These auxiliary bracket-plates are of the same construction, each comprising, as shown in Fig. 3, a body-section $b^2$ and a shank-section $b^3$. The body-section terminates at the rear upper edge of the frame and is secured by rivets or bolts 14$^a$ to the said frame, while the shank extends over the cutting-edge of the frame in like manner as the shank of the main bracket-plate, and is also curved or concaved upon its forward face, but the forward faces of the shanks of the auxiliary bracket-plates are likewise given a transverse inclination in direction of the center of the frame, and a cheek 17 or flange is formed upon the outer edge of the body-section of each auxiliary bracket-plate, extending to the back of the shank-section $b^3$, as shown in Figs. 1 and 3.

Each auxiliary bracket-plate carries a tooth or shovel C', which is longitudinally concaved upon its forward face and its lower edge is beveled from the inner side downward to the outside, forming a chisel-like cutting-edge, and the outer side edge of each of the said teeth or shovels has likewise a cutting-edge. It will thus be observed that while the side teeth or shovels are curved in a vertical direction downwardly and forwardly they have likewise a transverse inclination or sheer in direction of the front central portion of the frame, directing the ground that is loosened or cut by the teeth in that direction.

At the outer extremity of each member of the frame B a bracket-plate D is secured to the frame, as shown in Fig. 2, comprising a body portion $d$ bolted or riveted to the frame and having as in the central bracket-plate a downwardly-extending flange 18 formed at the back. The body $d$ connects at its forward end with a shank $d'$ curved longitudinally and inclined transversely in like manner as the shanks of the intermediate side brackets B'. The end brackets D are further provided with a high cheek or flange 19, extending usually from the top of the shank rearwardly to the rear extremity of the body. The end teeth or shovels C' are of the same shape and construction as the intermediate shovels, and are preferably made from sheet metal, but they may be cast or forged from heavier material, if desired.

The cheeks on the end brackets D are connected by a tie-bar E, the construction of which is best shown in Fig. 2, in which it will be observed to be substantially angular, its longer member having an upward and forward inclination and its shorter member a rearward and upward inclination. The tie-bar is provided at each extremity with a downwardly-extending flange 20, adjustably secured to the cheeks of the end bracket-plates by means of bolts 21, or like devices, a sufficient number of apertures 22 being made in the said cheeks 19 to permit this tie-bar to be raised or lowered or its angle changed. Two handles 23 are secured to this tie-bar at convenient points from the center for the purpose of enabling an operator to guide the machine, and pin-like teeth 24 are secured in the rear member of the tie-bar, being given a downward and rearward inclination, as is likewise shown in Fig. 2, the said rear teeth virtually comprising a comb, of which the tie-bar is the body.

Upon the forward movement of the machine the teeth or shovels C', being set at an angle and having beveled cutting-edges, will move the soil loosened by the teeth toward the center of the machine, the frame A following the teeth through the loosened earth, and being set at reverse angles to the teeth, having its upper surface inclined backward, the said frame will move the earth or soil under which it passes back into its original position in the line of cultivation. The forward or cutting edges of the frame will pass through that portion of the soil left unworked by the teeth or shovels, and thereby a complete destruction of all weeds within the path of the machine is accomplished.

The tie-bar E in passing over the surface of the loosened soil smooths the same by reason of the under surface of the tie-bar coming in contact with the soil, while the soil is leveled and at the same time slightly loosened or lightened by the combing action of the rear teeth 24. Thus it will be observed that this machine will cultivate the ground, exterminate all weeds, pulverize and cultivate the surface and level the same.

The frame A being directly back of the teeth or shovels C', and being adapted to pass through the soil below its surface, having a forward cutting-edge, combines the features of a frame and weed-cutter, and this construction does away with the overhead carriage and toothed supporting-arms commonly used in the present styles of cultivators and will allow all weeds or other rubbish to pass over the frame and the teeth without bunching.

The cut made by the cultivating teeth or shovels is a slicing cut, and the machine will operate successfully no matter at what angle it may be placed to its work, and I desire it to be understood that by changing the direction of the cheeks of the intermediate brackets B', for example, inclining them outwardly and forwardly at their upper ends, the earth may be directed to the ends of the machine instead of to the center.

The frame is available for use with any form of tooth commonly in use and need not of necessity be V-shaped.

Having thus described my invention, I claim as new and desire to secure by Letters Patent—

1. A cultivator, the frame of which is provided with a forward cutting-edge and teeth or shovels located at the cutting-edge and extending above and below the same substantially as shown and described.

2. In a cultivator, a frame having a forward cutting-edge, brackets carried by said frame having shanks vertically located at the cutting-edge of the frame, and teeth or shovels secured to the said shanks and extending above and below the cutting-edge of the frame substantially as shown and described.

3. In a cultivator, a substantially V-shaped frame having an upward and rearward inclination, its forward edge being a cutting-edge, and brackets carried by the said frame, having concave shanks vertically located at the cutting-edge of the frame, and longitudinally-curved teeth or shovels secured to the said shanks, as and for the purpose specified.

4. In a cultivator, a substantially V-shaped frame having an upward and rearward inclination, its forward edge being a cutting-edge, brackets carried by the said frame having concaved shanks vertically located at the cutting-edge of the frame, and longitudinally-curved shovels secured to the said shanks, having their lower cutting-edges beveled from one side downwardly in direction of the opposite side, the cultivator blades or shovels having also a pitch transversely in direction of the center of the frame, as and for the purpose set forth.

5. In a cultivator, a frame having an upward inclination, being substantially V-shaped in general contour and having a forward cutting-edge, bracket-plates secured to the said frame and provided with shanks extending above and below the cutting-edge of the frame, and cheeks extending rearward from the shanks at one side thereof, and longitudinally-concaved shovels secured to the said shanks, having a transverse sheer and having one side edge substantially flush with the cheek of the bracket to which it is secured, as and for the purpose set forth.

6. A cultivator provided with a substantially V-frame having an upward and rearward pitch and a forward cutting-edge, shovels secured to the said frame, vertically disposed at the cutting-edge, being given a transverse sheer, a tie-bar connecting the rear of the frame, and a comb carried by the said bar, substantially as described.

7. A cultivator, the same consisting of a substantially V-frame having an upward and rearward inclination and a forward cutting-edge, cultivator-teeth carried by the said frame, being located in advance of its cutting-edge, and a smoothing bar and comb located at the rear of the said frame, substantially as described.

ALFRED JAMES MORLEY.

Witnesses:
H. G. TURNER,
JOHN P. FISK, Jr.